(12) United States Patent
Nakagawa et al.

(10) Patent No.: US 7,413,515 B2
(45) Date of Patent: Aug. 19, 2008

(54) DRIVE SHAFT FOR ATVS

(75) Inventors: Tohru Nakagawa, Shizuoka-ken (JP); Masazumi Kobayashi, Shizuoka-ken (JP); Takaaki Shibata, Shizuoka-ken (JP)

(73) Assignee: NTN Corporation, Osaka (JP)

( * ) Notice: Subject to any disclaimer, the term of this patent is extended or adjusted under 35 U.S.C. 154(b) by 89 days.

(21) Appl. No.: 11/123,238

(22) Filed: May 6, 2005

(65) Prior Publication Data
US 2005/0261068 A1 Nov. 24, 2005

(30) Foreign Application Priority Data
May 24, 2004 (JP) .............. 2004-153875

(51) Int. Cl.
*F16D 3/00* (2006.01)

(52) U.S. Cl. ...................... 464/146; 464/906

(58) Field of Classification Search ........... 464/145, 464/146, 906
See application file for complete search history.

(56) References Cited
U.S. PATENT DOCUMENTS
6,299,543 B1 * 10/2001 Sone et al. .......... 464/146

\* cited by examiner

*Primary Examiner*—Aaron M Dunwoody
(74) *Attorney, Agent, or Firm*—Arent Fox LLP

(57) ABSTRACT

In a drive shaft which is installed in a mounted type vehicle designed to traverse uneven terrains and which transmits drive power to the wheels through constant velocity joints on the inboard and outboard sides, a double offset type constant velocity joint is used on the inboard side and an undercut free type constant velocity joint is used on the outboard side, the ratio of the PCD of the double offset type constant velocity joint to the ball diameter (PCD/d=$r_1$) being in the range $3.0 < r_1 < 3.2$.

5 Claims, 5 Drawing Sheets

DRIVE SHAFT FOR ATVS

BACKGROUND OF THE INVENTION

1. Field of the Invention

This invention relates to a drive shaft for ATVs (All Terrain Vehicle: a mounted type vehicle designed to traverse uneven terrains, also called a four-wheeled buggy).

2. Brief Description of the Prior Art

An ATV, which is a mounted type of four-wheeled or three-wheeled vehicle designed to traverse uneven terrains, is equipped with balloon tires to freely traverse such uneven terrains as wasteland and sandy place. The power transmission device for ATVs, as conceptually shown in FIG. 4, is constructed such that, for example, the power from an engine 21 is outputted from the output shafts on the front and rear sides via a speed change mechanism in the interior and is inputted to differential gears 24 and 25 on the front and rear sides via power transmission means 22 and 23, such as chains or propeller shafts. And, the engine power inputted to the differential gears 24 and 25 is reduced in speed by the mechanism of the differential gears 24 and 25 and is converted to a rotational power in a direction orthogonal thereto, whereupon it is transmitted to the front wheels 28 and rear wheels 29 through drive shafts 26 and 27. In the example shown in the same figure, constant velocity joints are used for joints A between the drive shaft 26 on the front side and the differential gear 24 and for joints B in the front wheels 28. In addition, there are cases where constant velocity joints are used for joints C between the drive shaft 27 on the rear side and the differential gear 25 and for joints D in the rear wheels 29. Further, when propeller shafts are used as the power transmission means 22 and 23, there are cases where constant velocity joints are used for joints E and F between the propeller shafts and the output shafts of the engine (speed change mechanism) 21 and joints G and H in the differential gears 24 and 25.

FIG. 5 shows the drive shaft 26 on the front side. In order to allow the drive shaft 26 to make angular displacement and axial displacement following the movement of the front wheel 28 during cornering, traversing uneven terrains or the like movement, a slide type constant velocity joint 30 and a fixed type constant velocity joint 31 are used in pair for joining the drive shaft 26. Here, the fixed type constant velocity joint means a constant velocity joint that allows only an angular displacement between two shafts, while the slide type constant velocity joint means a constant velocity joint that allows not only an angular displacement between two shafts but also an axial displacement (plunging). In the example shown in the same figure, the inboard side of the drive shaft 26 is joined to the differential gear 24 (at the joining section A) through the slide type constant velocity joint (double offset type constant velocity joint, hereinafter referred to as "DOJ") 30, while the outboard side of the drive shaft 26 is joined to the wheel 28 (at the joining section B) through a fixed type constant velocity joint (Rzeppa type constant velocity joint: ball fixed joint, hereinafter referred to as "BJ") 31.

Heretofore, as the DOJ and BJ, those for passenger cars have been frequently converted to be used as such. Refer to FIGS. 6 and 7 of Japanese Patent Application Laid-Open under No. 2001-97063.

Since vehicle weight restrictions are severe particularly for ATVs, further weight reduction or size compaction has been required of the drive shafts thereof. Especially, since the drive shaft occupies a large proportion of the car body weight, the demand for weight reduction has been very strong. Further, since ATVs are small in size, narrow in width and high in vehicle height, the normal working angle of the constant velocity joints installed in the drive shaft is nearly twice that of those for passenger cars. For this reason, for passenger car specifications, the working stability of the constant velocity joints would be impaired depending on usage conditions or the like. Further, about half of the durability (life) of constant velocity joints for passenger cars or the like is sufficient for constant velocity joints for ATV as considered from balance between market performance and the term of guarantee; therefore, considered on the basis of passenger car specifications as they are, there is a feeling of excessive quality consciousness. As to the frequency of use, about half for passenger car specifications is sufficient as considered from balance with vehicle speed, and the same may be said. On the other hand, in the aspect of strength, such as twist strength, the same degree as for passenger car specifications is required.

SUMMARY OF THE INVENTION

With consideration given to the situation peculiar to ATVs described above, a main object of the invention is to provide a light-weight compact drive shaft for ATVs.

To achieve the object, the invention provides a drive shaft which is installed in a mounted type vehicle designed to traverse uneven terrains and which transmits drive power to the front wheels through constant velocity joints on the inboard and outboard sides, the drive shaft being characterized in that a double offset type constant velocity joint is used on the inboard side and an undercut free type constant velocity joint is used on the outboard side, the ratio of the pitch circle diameter (hereinafter referred to as "PCD") of the double offset type constant velocity joint to the ball diameter (PCD/d=$r_1$) being in the range $3.0<r_1<3.2$.

In the case of a conventional high angle DOJ (for example, the maximum working angle, 30.5°), the ratio of the PCD to the ball diameter (PCD/d=$r_1$) has been in the range $2.7<r_1<2.9$, while in the invention it is in the range $3.0<r_1<3.2$, and although the PCD is made smaller, the ball diameter is made far smaller. In order to hold the reduction of durability in an allowable range in consideration of use for ATVs, the ball diameter is greatly reduced and to secure strength, it is preferable that the extent of reduction of PCD be held to a minimum.

The ratio of the outer ring outer diameter to the inner ring serration PCD dimension ($D_{outer}/PCD_{serr}=r_2$) in the double offset type constant velocity joint may be such that $3.2<r_2<3.4$. The inner ring serration PCD dimension ($PCD_{serr}$) is a dimension which is fixed according to size. Therefore, it is meant that the smaller the value of the ratio of the outer ring outer diameter to the inner ring serration PCD dimension ($D_{outer}/PCD_{serr}=r_2$), the smaller the outer ring outer diameter.

The value of the ratio of the cage offset amount to pitch circle radius (hereinafter referred to as "PCR") (PCD of track groove/2) in a double offset type constant velocity joint may be in the range of 0.152-0.153. In the case of a conventional high angle DOJ (for example, the maximum working angle, 30.5°), the value of the ratio of the cage offset amount to PCR has been 0.193-0.196, while in the invention it is 0.152-0.153, and the cage offset amount is reduced. In the invention, the cage offset amount has been set smaller than in the prior art in order to achieve light weight and size compaction. Even if the cage offset amount is made smaller, the durability can be set at about 70% for passenger car specifications, thereby making it possible to reliably prevent the balls from jumping out of the cage pockets when the cage takes the maximum working angle.

As already described, high angle DOJs for automobiles have heretofore been converted for use with ATVs. As for automobile DOJ, there are about four types in terms of joint maximum angle. Since ATVs require high angles, the type in which the maximum angle is largest has been applied. At this time, even in the case of automobile DOJs of the same size, the outer ring outer diameters differ according to the joint maximum angle. In other words, high angle articles are increased in outer ring outer diameter and thickness. The needs for DOJs for ATVs require high angles, the same degree of strength, and 60% of durability; therefore, specifications for DOJs for ATVs have been established which are designed for outer ring outer diameter reduction, PCD reduction, and ball diameter reduction, low cost, and compactness.

In addition, reducing the ball diameter and PCD despite the reduction of the outer ring outer diameter makes it possible to secure the existing level of outer ring thickness and to maintain the outer ring strength to some extent. At this time, the reduction of PCD and ball diameter increases surface pressure, leading to a reduction in durability. This amount of reduction, however, is in an allowable range in consideration of use for ATVs.

As is clear from what has been described so far, according to the invention, it is possible to provide a drive shaft for ATVs which is light-weight and compact.

Embodiments of the invention will now be described with reference to the drawings.

DESCRIPTION OF THE PREFERRED EMBODIMENTS

Figure 1:
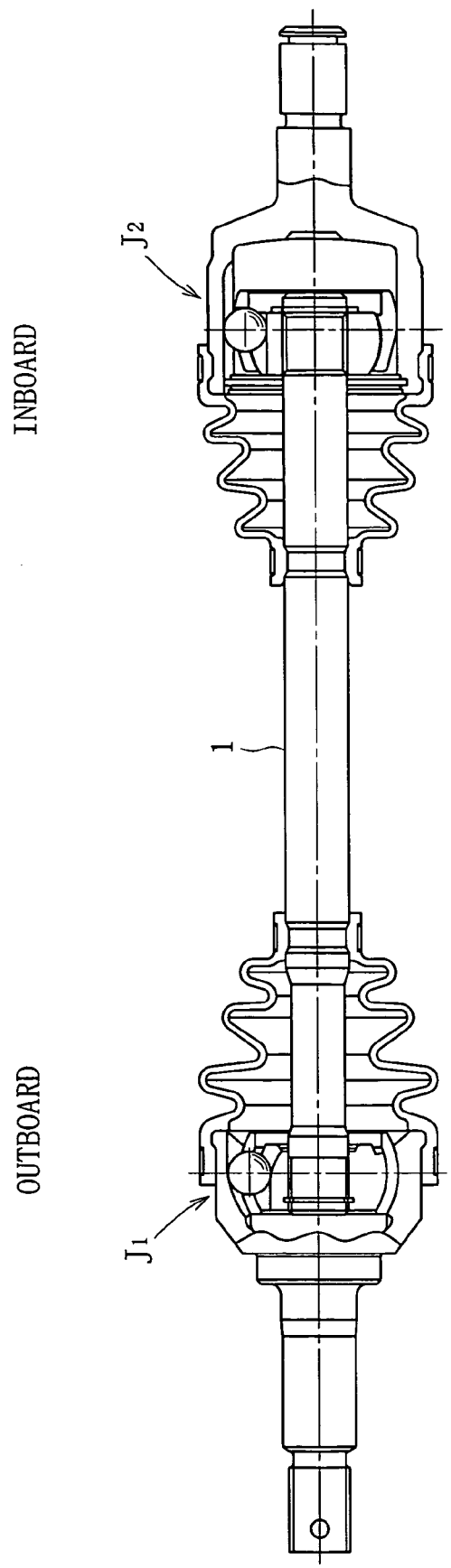
FIG. 1 is a longitudinal sectional view of a drive shaft for ATVs, showing an embodiment of the invention.
Figure 4:
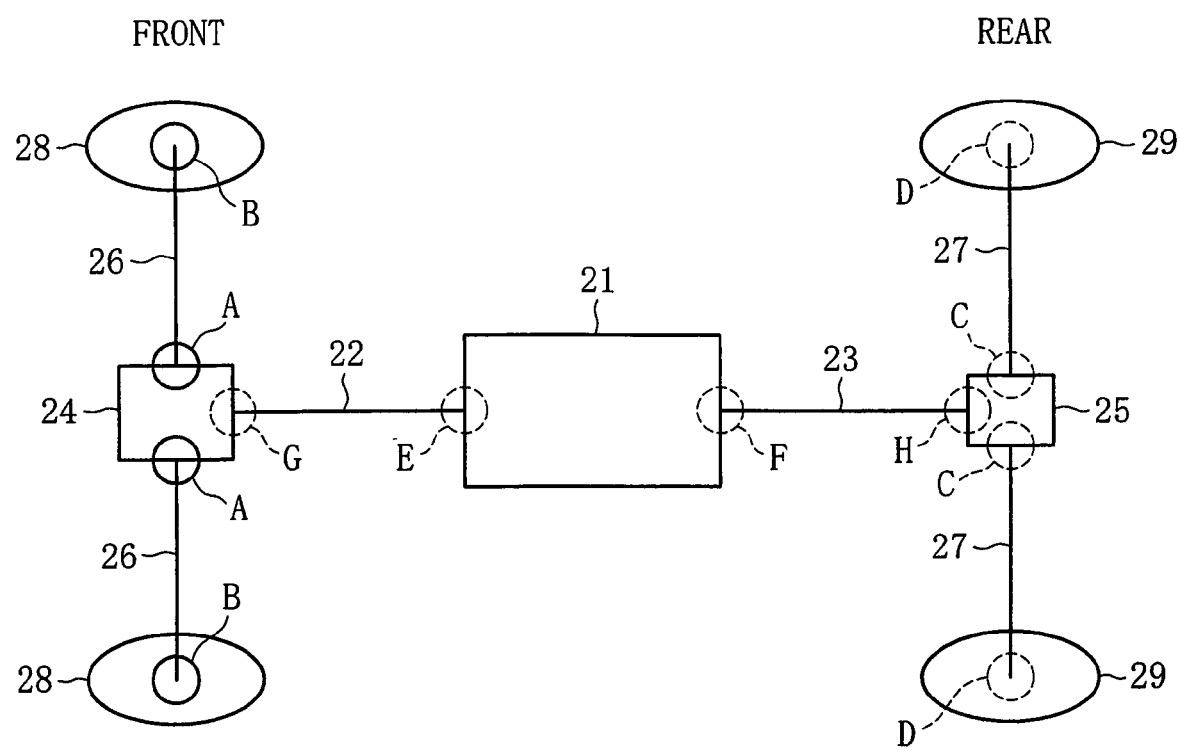
FIG. 4 is a conceptual view of a power transmission device for ATVs.
Figure 5:
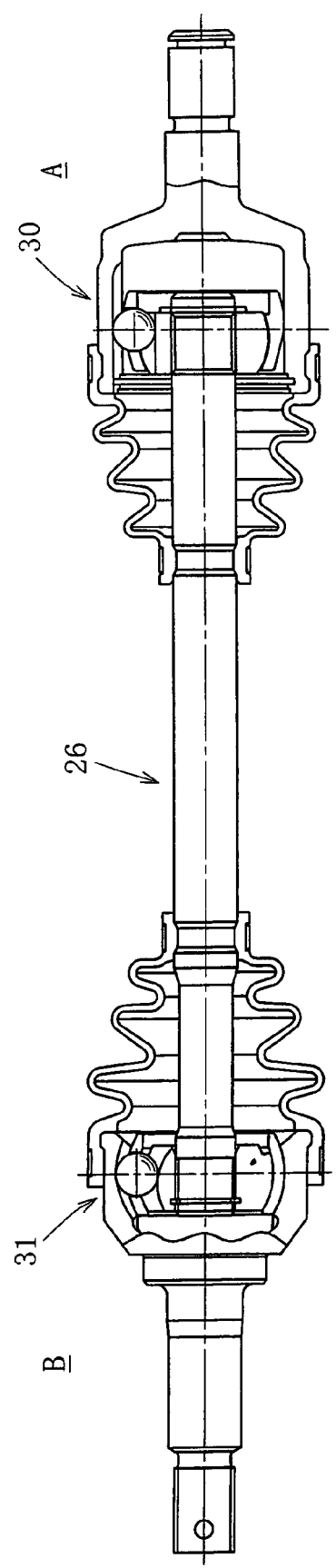
FIG. 5 is a longitudinal sectional view of a conventional drive shaft for ATVs.

A drive shaft for ATVs, as shown in FIG. 1, comprises a constant velocity joint $J_1$ on the outboard side, a constant velocity joint $J_2$ on the inboard side, and an intermediate shaft 1 joining the two joints $J_1$ and $J_2$. The constant velocity joint $J_1$ on the outboard side is joined to a wheel, while the constant velocity joint $J_2$ on the inboard side is joined to a differential gear (see FIG. 4).

Figure 2:
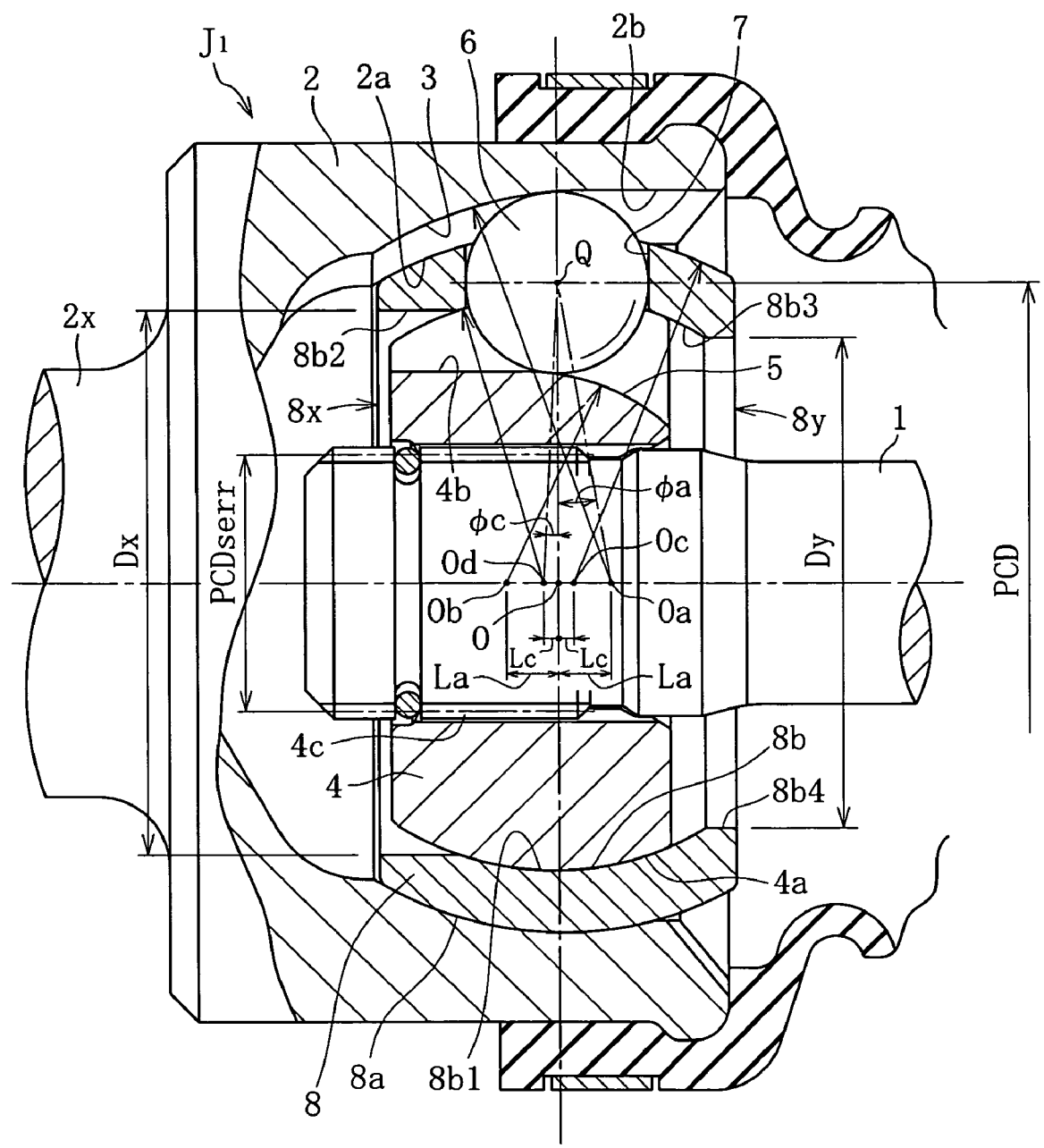
FIG. 2 is a longitudinal sectional view of a UJ in the drive shaft of FIG. 1.

The constant velocity joint $J_1$ on the outboard side is constituted by an undercut free type constant velocity joint (UJ). FIG. 2 illustrates a state assumed when the working angle θ of the undercut free type constant velocity joint is 0°. This constant velocity joint $J_1$ comprises an outer joint member 2 (outer ring) with a spherical inner peripheral surface 2a axially formed with a plurality (six or eight) of bottom-curved track grooves 3, an inner joint member 4 (inner ring) with a spherical outer peripheral surface 4a axially formed with a plurality (six or eight) of bottom-curved track grooves 5, a plurality (six or eight) torque transmitting balls 6 disposed in ball track formed by the opposed track grooves 3 and 5 of both joint members 2 and 4, and a cage 8 interposed between both joint members 2 and 4 and receiving and holding the torque transmitting balls 6 in a plurality of window-shaped pockets 7. And, the intermediate shaft 1 of the drive shaft (see FIG. 1) is joined to the inner joint member 4 through serrations 4c (or splines) formed in the inner periphery thereof, while a wheel-side member is joined to the stem 2x of the outer joint member 2.

As shown in FIG. 2, the ball track formed from the track groove 3 of the outer joint member 2 and the track groove 5 of the inner joint member 4 exhibits a shape (a wedge shape) which is wide in the inboard side (the right side in the same figure), gradually diminishing toward the outboard side (the left side in the same figure). In this case, the inboard-side region of the track groove 3 of the outer joint member 2, and the outboard-side region of the track groove 5 of the inner joint member 4 are formed with straight sections 2b and 4b, respectively, whose groove bottoms are linear as seen in a longitudinal section. The presence of the straight sections 2b and 4b results in the maximum working angle being set at 50°, which is greater than the conventional passenger car BJ maximum working angle (46.5°).

The center Od of the inner peripheral spherical surface 8b of the cage 8 is offset by a distance Lc taken axially from the joint center O to the outboard side. A cage offset angle φ c consisting of ∠OdQO defined by the center Od of the inner peripheral spherical surface 8b, the center Q of the torque transmitting ball 6, and the joint center O, that is, the offset angle of the inner spherical surface 8b of the cage 8 is set greater than 0° but less than 1° (preferably, 0.5°-0.8°, and in this embodiment, 0.7°). Further, the center Oc of the outer peripheral spherical surface 8a of the cage 8 is offset by the same distance Lc as above taken axially from the joint center O to the inboard side. A cage offset angle consisting of ∠OcQO defined by the center Oc of the outer peripheral spherical surface 8a, the center Q of the torque transmitting ball 6, and the joint center O is set greater than 0° but less than 1° (preferably, 0.5°-0.8°, and in this embodiment, 0.7°), in the same manner as above. In addition, the diameter of the spherical inner peripheral surface 2a of the outer joint member 2 and the diameter of the inner peripheral spherical surface 8b of the cage 8 are smaller at the opposite ends than at the axial center, though not shown, while the diameter of the outer peripheral spherical surface 8a of the cage 8 and the diameter of the spherical outer peripheral surface 4a of the inner joint member 4 are larger at the opposite ends than at the axial center. Thereby, the inner peripheral surface 2a of the outer joint member 2 and the outer spherical surface 8a of the cage 8 contact only at the axial opposite ends, and the inner spherical surface 8b of the cage 8 and the outer peripheral surface 4a of the inner joint member 4 also contact only at the axial opposite ends.

On the other hand, the center Oa of the track grooves 3 of the outer joint member 2 is offset by a distance La taken axially from the joint center O to the inboard side. From a total offset angle φa consisting of ∠OaQO defined by the center Oa of the track grooves 3 of the outer joint member 2, the center Q of the torque transmitting ball 6, and the joint center O is found the offset angle of the track of the outer joint member 3, which is φa-φc. This offset angle of the track grooves 3 of the outer joint member 3 is set at 4°-6° (in this embodiment, 5°). Further, the center Ob of the track grooves 5 of the inner joint member 4 is offset by the same distance La as above taken axially from the joint center O to the outboard side, and the track offset angle of the inner joint member 4 found from a total offset angle consisting of ∠ObQO defined by the center Ob of the track grooves 5 of the inner joint member 4, the center Q of the torque transmitting ball 6, and the joint center O is also set at 4°-6° (in this embodiment, 5°), in the same manner as above.

The diameter Dx of the opening 8x in the end of the cage 8 on the outboard side is set larger than the diameter Dy of the opening 8y in the end on the inboard side, the arrangement being such that the inner joint member 4 can be removably inserted in the cage 8 through the opening 8x on the outboard side. In this case, the diameter Dy of the opening 8y on the inboard side is set small with such a value that the inner joint member 4 cannot be removably inserted in the cage 8.

More specifically, whereas the outer peripheral surface 8a of the cage 8 is spherical substantially over the entire region (the region excluding the chamfered portions of the axial opposite ends), the inner peripheral surface 8b thereof is a spherical surface 8b1 in the axial central region (the region equal to or slightly larger than the axial width of the pocket 7), and the surface continuous with this spherical surface 8b1 is a cylindrical surface 8b2 on the outboard side and is a spherical surface 8b3 on the inboard side. In this case, the cylindrical surface 8b2 on the outboard side continuously extends to the end edge with substantially the same diameter, while the side which is further inboard of the spherical surface 8b3 on the inboard side is continuously formed with a cylindrical surface 8b4 which is smaller in diameter and in axial width than the cylindrical surface 8b2 on the outboard side.

Therefore, the thickness of the cage 8 gradually decreases as the cage extends from the axial central region to the outboard side, but gradually increases due to the cage offset as it extends for a predetermined distance from the axial central region to the inboard side. In other words, the average thickness of the inboard-side region, rather than the axial central region of the cage 8, is set such that it is greater than the average thickness of the outboard-side region. Further, the area of contact between the inner peripheral surface 8b of the cage 8 and the outer peripheral surface 4a of the inner joint member 4 is set such that it is narrower on the outboard side than on the inboard side. Along with this, the area of contact between the axial opposite sides of the pocket 7 in the inner peripheral surface 8b of the cage 8 and the outer peripheral surface 4a of the inner joint member 4 is set such that it is very narrow on the outboard side but becomes wider than that on the inboard side.

Further, the inboard-side end of the cage 8 projects from the inboard-side end of the outer joint member 2, whereby the axial width of the cage 8 is relatively long-sized. Further, the plurality of pockets 7 formed at equal intervals peripherally of the cage 8 are set the same in size (the same in axial width and peripheral length).

Figure 3:
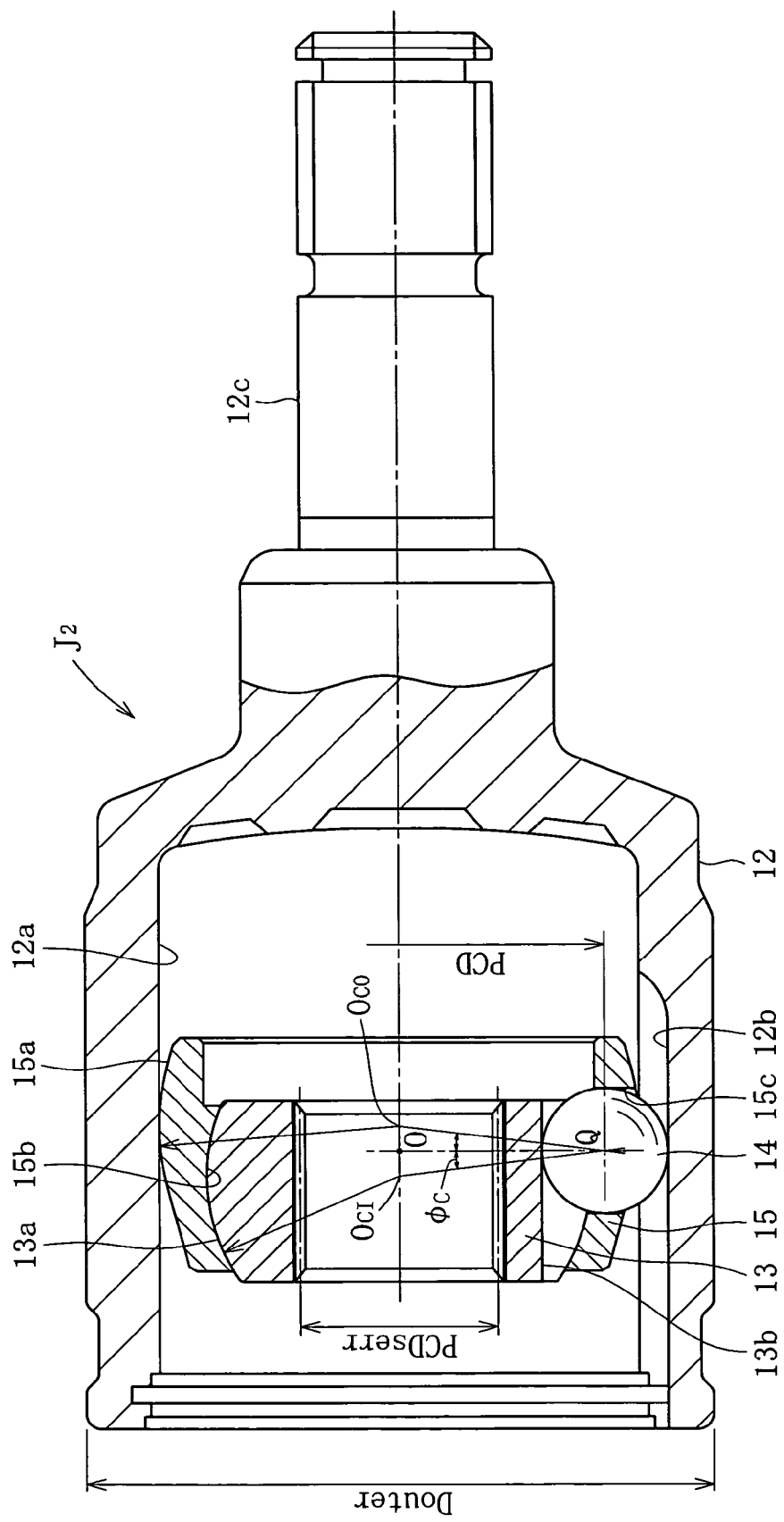
FIG. 3 is a longitudinal sectional view of a DOJ in the drive shaft of FIG. 1.

The constant velocity joint J2 on the inboard side is constituted by a double offset type constant velocity joint (DOJ). The DOJ, as shown in FIG. 3, comprises an outer ring (outer member) 12 whose cylindrical inner peripheral surface 12a is axially formed with a plurality (for example, 6) of linear track grooves 12b, an inner ring (inner member) 13 whose spherical outer peripheral surface 13a is axially formed with a plurality (for example, 6) of linear track grooves 13b, a plurality (for example, 6) of torque transmitting balls 14 disposed in a ball track defined by cooperation between the track grooves 12b of the outer ring 12 and the track grooves 13b of the inner ring 13, and a cage 15 for receiving the torque transmitting balls 14. The stem 12c of the outer ring 12 is joined to a differential gear, and the intermediate shaft 1 is joined to the inner periphery of the inner ring 13 through serrations or the like.

The cage 15 is an annulus comprising an outer spherical surface 15a contractually guided by the inner peripheral surface 12a of the outer ring 12, an inner spherical surface 15b contractually guided by the outer peripheral surface 13a of the inner ring 13, and a plurality (for example, 6) of pockets 15c for receiving the torque transmitting balls 14. The spherical center $O_{co}$ of the outer spherical surface 15a and the spherical center $O_{CI}$ of the inner spherical surface 15b are axially offset by equal spacings in mutually opposite directions with respect to the joint center O.

When this joint is transmitting torque while assuming working angle, the cage 15 rotates to the position of the torque transmitting balls 14 which move on the ball track according to the inclination of the inner ring 13, the cage 15 for receiving the torque transmitting balls 14 in a plane which bisects the working angle. Thereby, the constant velocity nature of the joint is secured. Further, when the outer and inner rings 12 and 13 axially relatively move, slippage occurs between the outer spherical surface 15a of the cage 15 and the inner peripheral surface 12a of the outer ring 12, enabling smooth axial movement (plunging).

The allowable maximum working angle of the DOJ disposed on the inboard side is smaller than that of the constant velocity joint (UJ) on the outboard side, being set, for example, at 30.5°.

In the DOJ, the cage offset angle $\phi c$ ($\angle O_{co}QO$ or $\angle O_{CI}QO$) defined by the spherical center $O_{co}$ of the cage outer spherical surface 15a, the ball center Q, and the joint center O is set such that $7° \leq \phi c < 9°$. This cage offset angle $\phi c$ has been set at 11.1°-11.3° in the case of high angle DOJs (maximum working angle, 30.5°) of conventional passenger car specifications. However, herein it is set at smaller values than before for light weight and size compaction. Even if the cage offset angle $\phi c$ is reduced in this manner, the track groove depths of the inner and outer rings can be made shallow, provided that the durability is set at about 70% of that for passenger car specifications. Thereby, the thickness of the cage 15 can be made large, thus making it possible to reliably prevent the balls 14 from jumping out of the cage pockets 15c when the allowable maximum working angle is taken. This cage offset is set such that the ratio of the cage offset to PCR is in the range 0.152-0.153. In this connection, in the case of conventional DOJs (the maximum working angle, 30.5°), the value of the ratio of the cage offset to PCR has been 0.193-0.196.

Further, the ratio of the PCD to the ball diameter ($PCD/d=r_1$) is set in the range $3.0<r_1<3.2$. In the case of a conventional DOJ (the maximum working angle, 30.5°), the ratio of the PCD to the ball diameter ($PCD/d=r_1$) has been in the range $2.7<r_1<2.9$. This is put in the range $3.0<r_1<3.2$, and although the PCD is made smaller, the ball diameter is made far smaller. In order to hold the reduction of durability in an allowable range in consideration of use for ATVs, the ball diameter is greatly reduced and the extent of reduction of PCD is held to a minimum in order to secure strength.

The ratio of the outer ring outer diameter to the inner ring serration PCD dimension ($D_{outer}/PCD_{serr}=r_2$) is such that $3.2<r_2<3.4$. The inner ring serration PCD dimension ($PCD_{serr}$) is a dimension which is fixed according to size, so that it can be utilized to express the degree of reduction of the outer ring outer diameter. In other words, it is meant that the smaller the value of the ratio of the outer ring outer diameter to the inner ring serration PCD dimension ($D_{outer}/PCD_{serr}=r_2$), the smaller the outer diameter of the DOJ.

The drive shaft described so far can be used not only on the front side but also on the rear side of ATVs.

What is claimed is:

1. A drive shaft for ATVs which is installed in a vehicle designed to traverse uneven terrains and which transmits drive power to the wheels through constant velocity joints on the inboard and outboard sides, the drive shaft comprising:

a double offset type constant velocity joint used on the inboard side; and an undercut free type constant velocity joint used on the outboard side, wherein the undercut free type constant velocity joint includes an inner joint member having a spherical outer peripheral surface that includes a plurality of bottom-curved track grooves, wherein the ratio of the pitch circle diameter (PCD) of the double offset type constant velocity joint to the ball diameter (d), which is determined by the equation PCD/d=$r_1$, is in the range 3.0<$r_1$<3.2, wherein the undercut free type constant velocity joint includes an outer joint member having a plurality of bottom-curved track grooves defined therein opposite to the plurality of bottom-curved track grooves of the inner joint member, the plurality of bottom-curved track grooves of the outer joint member and the plurality of bottom-curved track grooves of the inner joint member defining a corresponding plurality of wedge shaped ball tracks, and wherein the wedge shape is wider on the inboard side relative to the outboard side.

2. The drive shaft according to claim 1, wherein a ratio of an outer ring outer diameter ($D_{outer}$) to an inner ring serration PCD dimension ($PCD_{serr}$), which is determined by the equation $D_{outer}/PCD_{serr}=r_2$, in the double offset type constant velocity joint is in the range of 3.2<$r_2$<3.4.

3. The drive shaft according to claim 1, wherein a ratio of a cage offset to a pitch circle radius (PCR) in the double offset type constant velocity joint is in the range 0.152-0.153.

4. A drive shaft for ATVs which is installed in a vehicle designed to traverse uneven terrains and which transmits drive power to the wheels through constant velocity joints on the inboard and outboard sides, the drive shaft comprising:

a double offset type constant velocity joint used on the inboard side; and an undercut free type constant velocity joint used on the outboard side, wherein the undercut free type constant velocity joint includes an inner joint member having a spherical outer peripheral surface that includes a plurality of bottom-curved track grooves, wherein the ratio of the pitch circle diameter (PCD) of the double offset type constant velocity joint to the ball diameter (d). which is determined by the equation PCD/d=$r_1$, is in the range 3.0<$r_1$<3.2, and wherein the spherical outer peripheral surface of the inner joint member of the undercut free type constant velocity joint includes a plurality of straight sections having linear bottom grooves that each transition to a corresponding one of the bottom-curved track grooves.

5. The drive shaft according to claim 4, wherein the undercut free type constant velocity joint includes a maximum working angle of 50°.

* * * * *